United States Patent
Nakamura et al.

(10) Patent No.: US 8,725,378 B2
(45) Date of Patent: May 13, 2014

(54) CONTROL SYSTEM FOR VEHICLE AND METHOD OF CONTROLLING VEHICLE

(75) Inventors: Taku Nakamura, Nagakute (JP); Tomohisa Yagi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 106 days.

(21) Appl. No.: 13/555,238

(22) Filed: Jul. 23, 2012

(65) Prior Publication Data
US 2013/0030669 A1    Jan. 31, 2013

(30) Foreign Application Priority Data
Jul. 27, 2011    (JP) .................. 2011-164452

(51) Int. Cl.
*B60T 8/72*    (2006.01)
*B60T 8/32*    (2006.01)

(52) U.S. Cl.
CPC ........................................ *B60T 8/32* (2013.01)
USPC ...................... 701/70; 188/181 A; 188/181 T

(58) Field of Classification Search
CPC ............. B60T 8/17; B60T 8/32; B60T 8/172; B60T 8/52; B60T 8/72; F16D 59/00; F16D 2066/005
USPC ................ 701/70, 78, 84, 87, 90; 188/181 A, 188/181 C, 181 T
See application file for complete search history.

(56) References Cited

U.S. PATENT DOCUMENTS

2010/0023234 A1 *  1/2010  Kameyama ...................... 701/70
2012/0212353 A1 *  8/2012  Fung et al. ..................... 340/905

FOREIGN PATENT DOCUMENTS

| JP | 61-190135 A   | 8/1986 |
| JP | 2002036944 A  | 2/2002 |
| JP | 2006224778 A  | 8/2006 |
| JP | 2010059820 A  | 3/2010 |
| JP | 2011122607 A  | 6/2011 |

* cited by examiner

*Primary Examiner* — Mary Cheung
(74) *Attorney, Agent, or Firm* — Gifford, Krass, Sprinkle, Anderson & Citkowski, P.C.

(57) ABSTRACT

A control system for a vehicle restricts engine torque when an accelerator operation amount is large and it is determined that the direction of the driver's face changed between forward and backward of the vehicle.

8 Claims, 2 Drawing Sheets

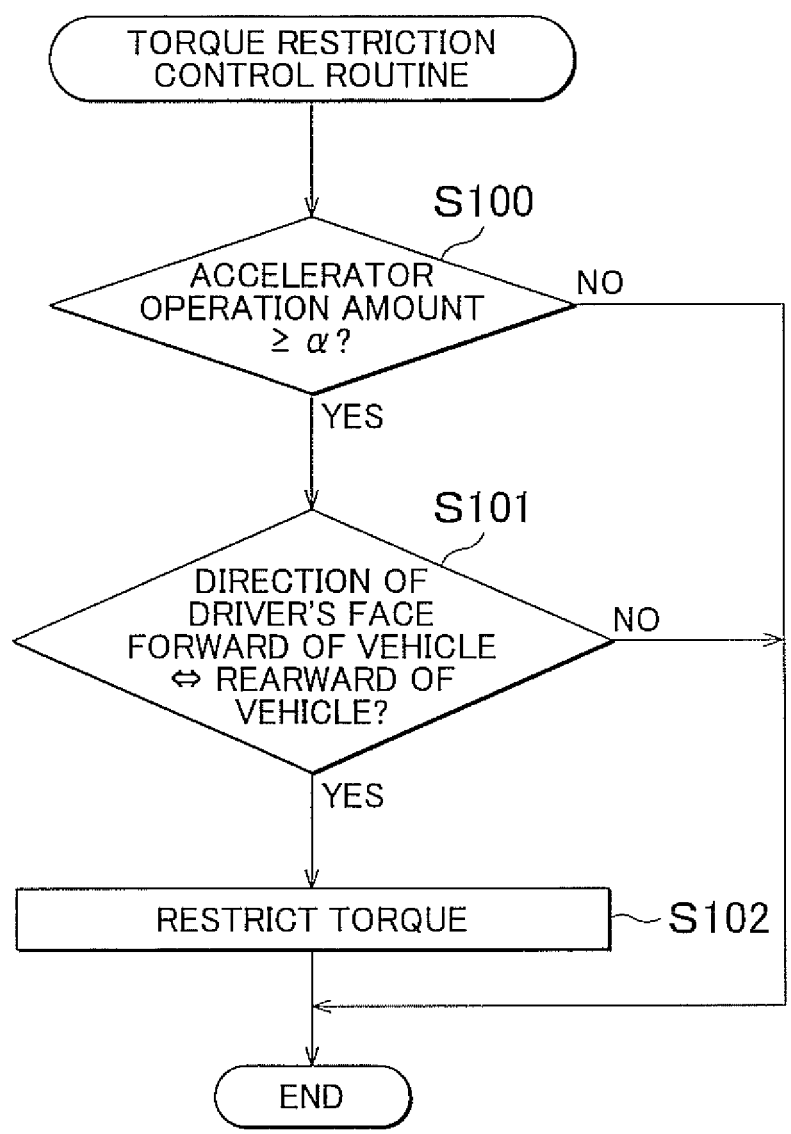

CONTROL SYSTEM FOR VEHICLE AND METHOD OF CONTROLLING VEHICLE

CROSS REFERENCE TO RELATED APPLICATIONS

This application claims priority to Japanese Patent Application No. 2011-164452, filed on Jul. 27, 2011, is incorporated herein by reference in its entirety including the specification, drawings and abstract.

BACKGROUND OF THE INVENTION

1. Field of the Invention

The invention relates to control system and method for a vehicle, which restrict torque of a drive source when an accelerator pedal is strongly or largely operated.

2. Description of the Related Art

Japanese Patent Application Publication No. 61-190135 (JP 61-190135 A) discloses a technology of restricting engine torque when the gear ratio of a transmission is large, and the force or pressure applied to the accelerator pedal or the rate or speed of depression of the accelerator pedal is large.

In the meantime, the driver may strongly press down the accelerator pedal for the purpose of rapidly accelerating the vehicle, as in the case where the vehicle on a merging lane merges onto a main track of an expressway, for example. With the technology disclosed in the above-identified publication, the engine torque is restricted in the same manner even in this case, and the vehicle may not be accelerated as intended by the driver, resulting in deterioration of the driveability.

SUMMARY OF THE INVENTION

The invention provides control system and method for a vehicle, which prevent torque from being restricted or reduced against a driver's intention to accelerate the vehicle, so as to suppress or avoid deterioration of the driveability.

A control system for a vehicle according to a first aspect of the invention includes a controller that restricts torque of a drive source when an amount or rate of operation of an accelerator pedal is greater than a predetermined value. In the control system, the controller sets a degree of restriction of the torque to a larger value when a direction of a face of a driver changes between forward and backward of the vehicle, as compared with the degree of restriction of the torque when the direction of the face of the driver does not change between forward and backward of the vehicle.

When the driver, who is facing forward, turns his/her head to the rear of the vehicle, or the driver, who is facing backward, turns his/her head to the front of the vehicle, it may be determined that the driver has no or only a small intention of accelerating the vehicle. Therefore, even if the degree of restriction of torque is made larger when the direction of the driver's face changes between forward of the vehicle and backward of the vehicle, than that when the direction of the driver's face does not change, the torque will not be restricted against the driver's intention to accelerate the vehicle, and the driveability will not deteriorate.

In this connection, an image of the head of the driver may be captured, and the direction of the face of the driver may be determined based on the captured image.

The driver often changes the direction of his/her face between forward and backward of the vehicle during parking in a parking lot, and is thus considered to have almost no intention to rapidly accelerate the vehicle in this situation. Therefore, if the degree of restriction of the torque when the direction of the face of the driver changes between forward and backward of the vehicle is increased under a condition that the vehicle is located in a parking lot, the restriction of the torque will not impede or interfere with a driver's intention to accelerate the vehicle, and the driveability will not deteriorate.

A method of controlling a vehicle according to a second aspect of the invention includes the steps of determining whether an amount or rate of operation of an accelerator pedal is greater than a predetermined value, and restricting torque of a drive source when the amount or rate of operation of the accelerator pedal is greater than the predetermined value. In this method, a degree of restriction of the torque is set to a larger value when a direction of a face of a driver changes between forward and backward of the vehicle, as compared with the degree of restriction of the torque when the direction of the face of the driver does not change between forward and backward of the vehicle.

BRIEF DESCRIPTION OF THE DRAWINGS

The features, advantages, and technical and industrial significance of this invention will be described in the following detailed description of an exemplary embodiment of the invention with reference to the accompanying drawings, in which like numerals denote like elements, and wherein:

FIG. 2 is a flowchart of a torque restriction control routine executed by the control system of the embodiment of FIG. 1.

DETAILED DESCRIPTION OF EMBODIMENT

Figure 1:
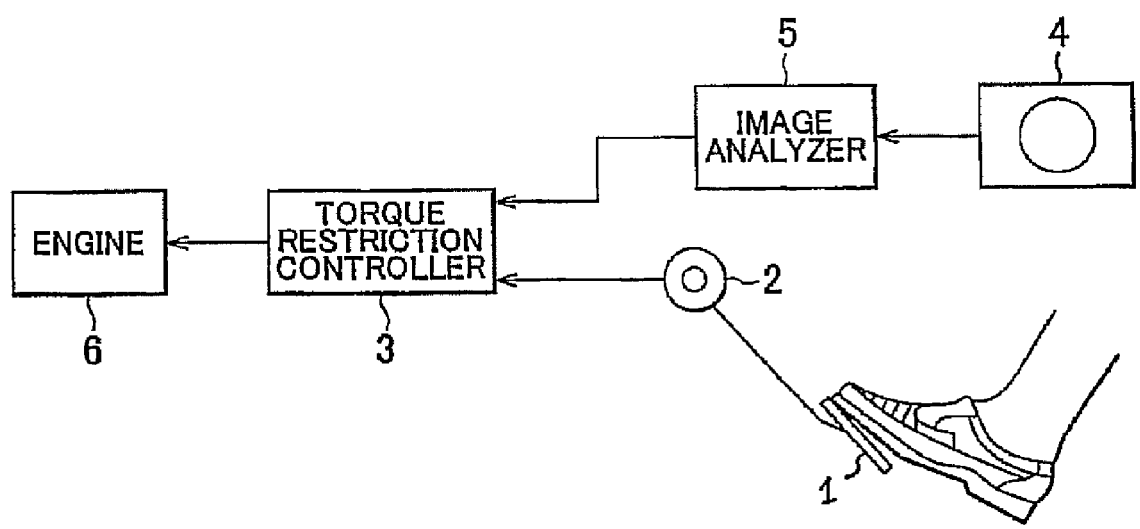
FIG. 1 is a functional block diagram schematically showing the configuration of a control system for a vehicle as one embodiment of the invention.

A control system for a vehicle as one embodiment of the invention will be described in detail with reference to FIG. 1 and FIG. 2. Referring initially to FIG. 1, the configuration of the vehicular control system according to this embodiment will be described. As shown in FIG. 1, the vehicular control system of this embodiment is provided with an accelerator pedal position sensor 2 that detects the amount of depression of the accelerator pedal 1 (the accelerator operation amount). The accelerator pedal position sensor 2 transmits a detection signal indicative of the accelerator operation amount, to a torque restriction controller 3.

Also, the vehicular control system of this embodiment is provided with an imaging device 4 that captures an image of the head of the driver. The imaging device 4 transmits image data representing the image of the driver's head, to an image analyzer 5. The image analyzer 5 detects the direction of the face of the driver by analyzing the image data received from the imaging device 4, and transmits the result of detection to the torque restriction controller 3.

The torque restriction controller 3 determines whether torque needs to be restricted, based on the accelerator operation amount transmitted from the accelerator pedal position sensor 2, and the direction of the face of the driver transmitted from the image analyzer 5. When it is determined that torque needs to be restricted, the torque restriction controller 3 restricts (e.g., reduces) the torque of the engine 6.

Referring next to FIG. 2, torque restriction control according to this embodiment will be described in detail. The torque restriction control is performed by executing a torque restriction control routine as shown in FIG. 2. The routine of FIG. 2 is repeatedly executed by the torque restriction controller 3 at predetermined intervals, during operation of the engine 6.

Once the control routine of FIG. 2 is started, it is initially determined in step S100 whether the accelerator operation amount is equal to or larger than a predetermined value α. If the accelerator operation amount is smaller than the predetermined value α (NO in step S100), the control routine of FIG. 2 ends.

If, on the other hand, the accelerator operation amount is equal to or larger than the predetermined value α (YES in step S100), it is determined in step S101 whether the direction of the face of the driver changed between forward of the vehicle and backward of the vehicle, i.e., whether the driver turned his/her face backward and forward of the vehicle. If such a change in the direction of the driver's face is not recognized (NO in step S101), the control routine of FIG. 2 ends. If, on the other hand, a change in the direction of the driver's face between forward and backward of the vehicle is recognized (YES in step S101), the torque of the engine 6 is restricted in step S102, and then the control routine of FIG. 2 ends. If the torque restriction is performed, the torque of the engine 6 is reduced to be smaller than a torque commensurate with the accelerator operation amount. In step S102, the torque is restricted by, for example, reducing the throttle opening of the engine 6 or reducing the fuel injection amount.

Next, the operation of the above-described embodiment will be described. The vehicular control system of this embodiment restricts the torque of the engine 6 only when the accelerator operation amount is large, and the direction of the driver's face changes between forward and backward of the vehicle. The driver's action to change the direction of his/her face as described above (i.e., the head turning action) is often seen during parking of the vehicle, for example. In this case, the driver may be considered as having no intention of rapidly accelerating the vehicle. Accordingly, even if the torque of the engine 6 is restricted in this case, the torque restriction will not impede or interfere with a driver's intention of accelerating the vehicle. On the other hand, when the driver intends to accelerate the vehicle, such as when the vehicle on a merging lane merges onto a main track of an expressway, the torque of the engine 6 is not restricted even if the accelerator operation amount is large; therefore, the vehicle will be accelerated as intended or desired by the driver.

The control system for the vehicle according to the above-described embodiment yields an effect as follows. In this embodiment, the torque of the engine 6 is restricted when the accelerator pedal is operated by a large amount, under a condition that a change in the direction of the driver's face between forward and backward of the vehicle is recognized. Therefore, the torque of the engine 6 is restricted only when the driver has no intention of accelerating the vehicle. Accordingly, torque restriction against the driver's intention to accelerate the vehicle is less likely or unlikely to occur, and the driveability is less likely or unlikely to deteriorate.

The present invention may also be embodied by modifying the illustrated embodiment as follows. In the illustrated embodiment, the torque of the engine 6 is restricted when the accelerator pedal is operated by a large amount, under the condition that a change in the direction of the driver's face between forward and backward of the vehicle is recognized. The above-described change in the direction of the driver's face often takes place during parking in a parking lot, for example; in this situation, the driver has almost no intention of rapidly accelerating the vehicle. Therefore, the degree of restriction of the torque when the direction of the driver's face changes between forward and backward of the vehicle may be increased under a condition that the vehicle is located in a parking lot. It is possible to check if the vehicle is located in a parking lot, based on information on the position of the vehicle obtained from a car navigation system, or a result of analysis of an image around the vehicle.

While the torque of the engine 6 is restricted when the accelerator operation amount is large in the illustrated embodiment, the torque of the engine 6 may be restricted when the force applied to the accelerator pedal is large or the rate or speed of operation of the accelerator pedal is high, namely, when a strong accelerating operation is performed.

While the torque of the engine 6 is not restricted when no change in the direction of the driver's face between forward and backward of the vehicle is recognized in the illustrated embodiment, the torque may be restricted to some extent even in this situation. In this case, too, the degree of restriction of the torque when the direction of the driver's face changed between forward and backward of the vehicle is made larger than that in the case where the direction of the driver's face did not change, so that the vehicle can be accelerated by some degree when no change is found in the direction of the driver's face. Thus, in this case, too, torque restriction against the driver's intention to accelerate the vehicle is less likely or unlikely to occur, and the driveability is less likely or unlikely to deteriorate.

In the illustrated embodiment, the direction of the driver's face is determined by capturing an image of the head of the driver, and analyzing the captured image data. However, the direction of the driver's face may be determined by other methods.

In the illustrated embodiment, the torque of the engine 6 is restricted when the accelerator pedal is largely or strongly operated. However, in a hybrid vehicle or electric vehicle using a motor as a drive source, similar control may be performed by restricting torque of the motor when the accelerator pedal is largely or strongly operated.

What is claimed is:

1. A control system for a vehicle, comprising a controller that restricts torque of a drive source when an amount or rate of operation of an accelerator pedal is greater than a predetermined value, wherein
the controller sets a degree of restriction of the torque to a larger value when a direction of a face of a driver changes between forward and backward of the vehicle, as compared with the degree of restriction of the torque when the direction of the face of the driver does not change between forward and backward of the vehicle.

2. The control system according to claim 1, wherein the controller increases the degree of restriction of the torque when the direction of the face of the driver changes between forward and backward of the vehicle, under a condition that the vehicle is located in a parking lot.

3. The control system according to claim 1, further comprising:
an imaging device that captures an image of a head of the driver; and
an image analyzer that determines the direction of the face of the driver based on the image captured by the imaging device.

4. The control system according to claim 3, wherein the controller increases the degree of restriction of the torque when the direction of the face of the driver changes between forward and backward of the vehicle, under a condition that the vehicle is located in a parking lot.

5. A method of controlling a vehicle, comprising:
determining whether an amount or rate of operation of an accelerator pedal is greater than a predetermined value; and restricting torque of a drive source when the amount or rate of operation of the accelerator pedal is greater than the predetermined value, wherein a degree of restriction of the torque is set to a larger value when a direction of a face of a driver changes between forward and backward of the vehicle, as compared with the degree of restriction of the torque when the direction of the face of the driver does not change between forward and backward of the vehicle.

6. The method according to claim 5, wherein the degree of restriction of the torque is increased when the direction of the face of the driver changes between forward and backward of the vehicle, under a condition that the vehicle is located in a parking lot.

7. The method according to claim 5, further comprising:
capturing an image of a head of the driver; and
determining the direction of the face of the driver based on the captured image.

8. The method according to claim 7, wherein the degree of restriction of the torque is increased when the direction of the face of the driver changes between forward and backward of the vehicle, under a condition that the vehicle is located in a parking lot.

* * * * *